United States Patent

Kruse, Jr.

[15] 3,656,333
[45] Apr. 18, 1972

[54] CYLINDRICAL SURFACE FINISHING TOOL

[72] Inventor: Clemens A. Kruse, Jr., 1718 Waverly, Ann Arbor, Mich. 47103

[22] Filed: May 21, 1970

[21] Appl. No.: 39,246

[52] U.S. Cl. ................................. 72/122, 29/90, 72/393
[51] Int. Cl. .......................... B24b 39/02, B21c 37/30
[58] Field of Search .............. 29/90, 523; 72/118, 119, 122, 72/123, 355, 393, 437, 445

[56] References Cited

UNITED STATES PATENTS

| 1,670,268 | 5/1928 | Mihatsch | 72/123 |
| 2,413,103 | 12/1946 | Forbes, Jr. | 72/393 |
| 2,219,784 | 10/1940 | Maupin | 29/90 |
| 2,817,385 | 12/1957 | Benjamin | 72/122 |
| 527,155 | 10/1894 | Pratt | 72/123 |

FOREIGN PATENTS OR APPLICATIONS

| 1,013,606 | 8/1957 | Germany | 29/90 |

Primary Examiner—Lowell A. Larson
Attorney—Harness, Dickey & Pierce

[57] ABSTRACT

The tool of the burnishing type has a cage at the working end of a spindle containing tapered rollers that engage a diverging truncated conical head on the end of the spindle. The opposite end of the spindle has a driven end on which a nonrotatable pressure applying unit is disposed. In one form the unit is a cylinder having a piston therein which exerts pressure on the cage supporting tube and forces the truncated conical rollers downwardly over the conical head and thereby exerts a substantial outward force on the rollers during the burnishing operation. A spring unit may be substituted for the cylinder and piston to apply the force to the sleeve and rollers.

8 Claims, 5 Drawing Figures

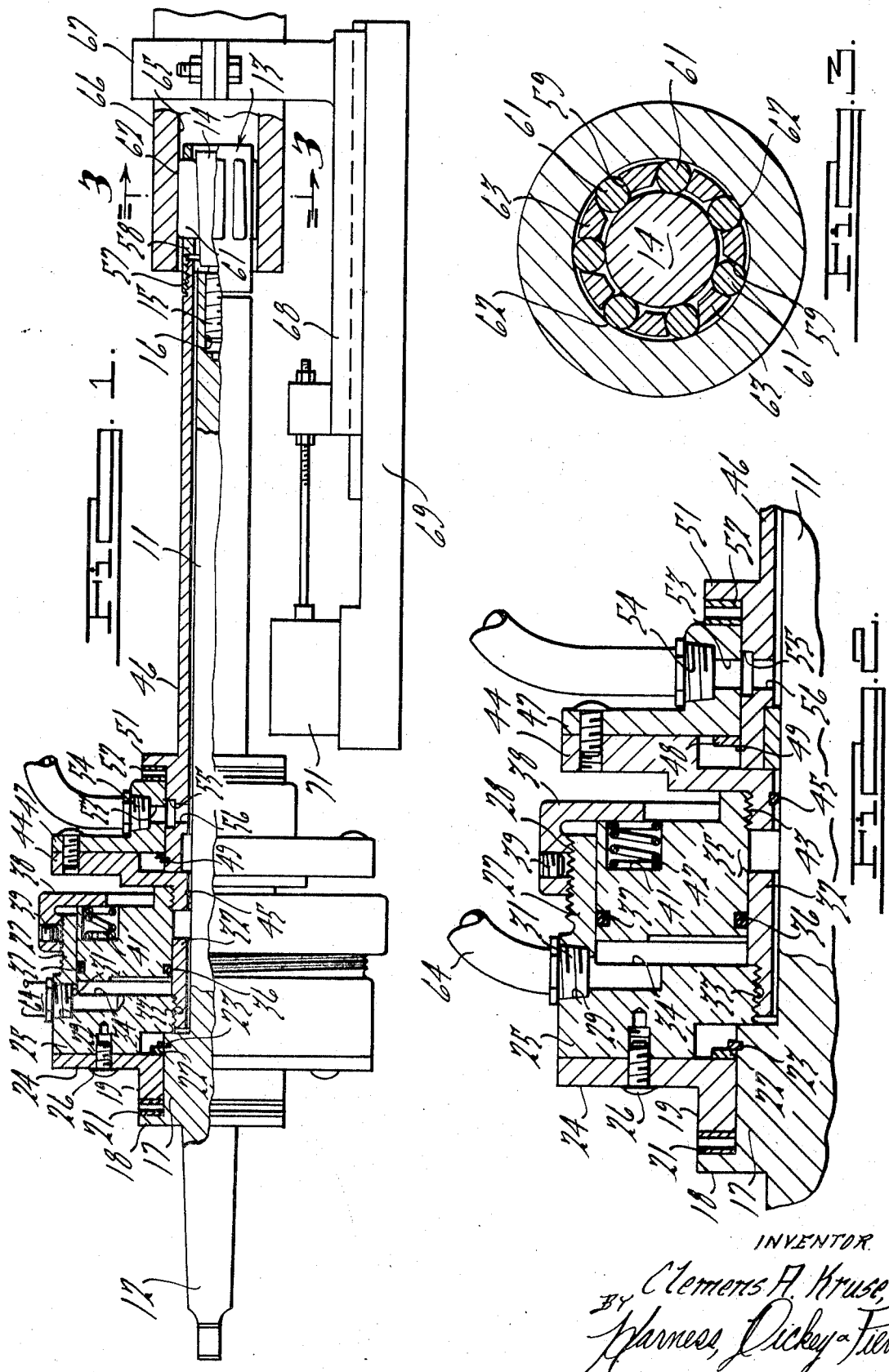

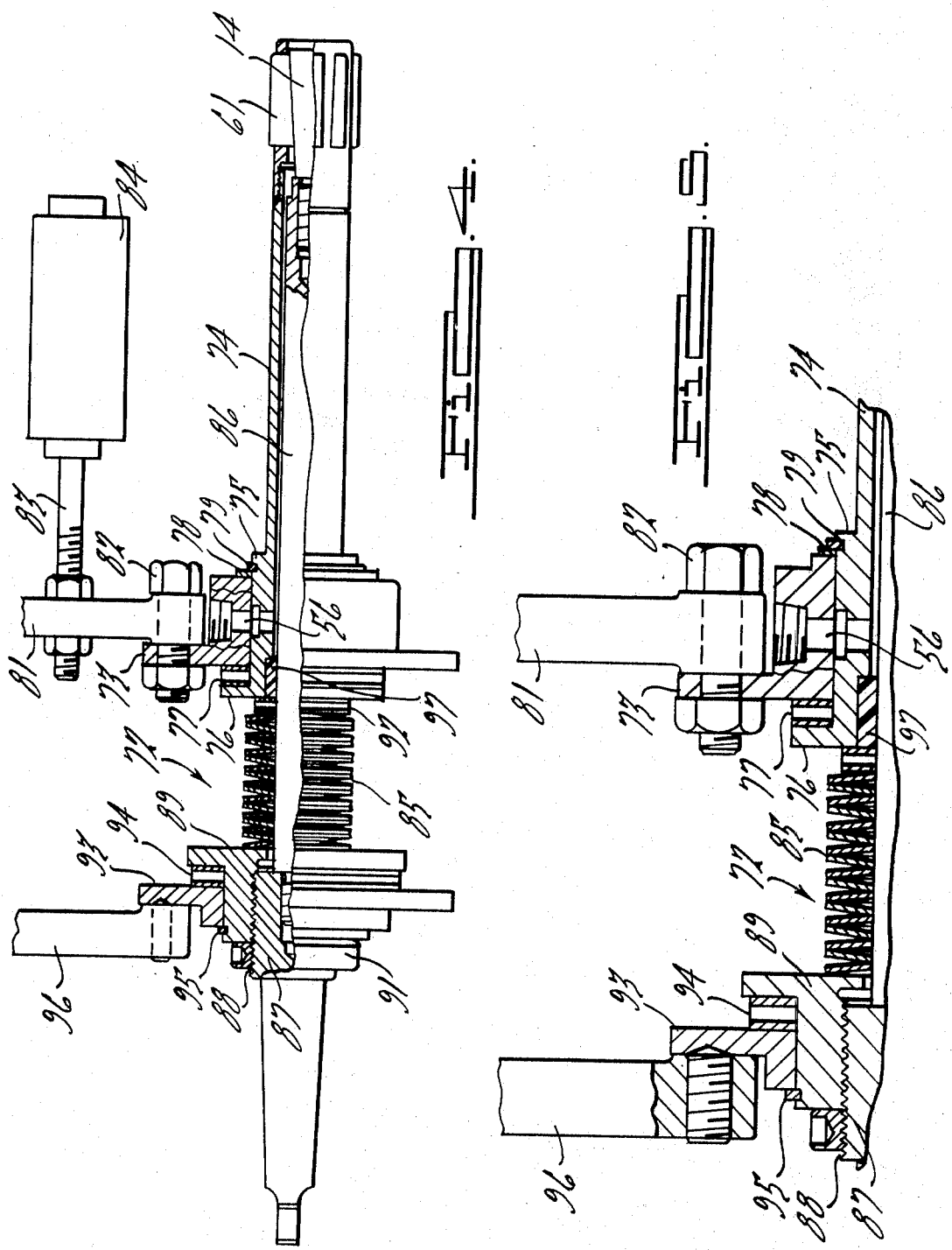

CYLINDRICAL SURFACE FINISHING TOOL

BACKGROUND OF THE INVENTION

Reference may be had to the patent to John E. Gustkey, No. 3,444,714, which discloses a similar type of tool that produces a peaning operation.

SUMMARY OF THE INVENTION

The invention pertains to a tool for producing a microfinish surface on the inner wall of a hollow cylindrical element. Many cylinders are constructed today having pistons therein containing seals of various types made of elastomeric or like wearable material. As a specific example, an O-ring will be carried backwardly and forwardly over the inner wall of the cylinder during the movement of the piston therewith in opposite directions. The machining operation to produce the inner wall, whether grinding, reaming, cutting and the like, leaves minute grooves and projections which can be said to be fine but which are coarse enough to cause substantial wear on the engaged O-ring surface. The present tool crushes the projecting portions and moves them into the depressions and thereby produces a very fine microfinished surface on the wall. The change in diameter is insignificant and no thought is given to sizing the aperture as any change in diameter will not effect the pressure engagement wherewith by the O-ring. However, the life of the O-ring is substantially increased and the danger of too much wear, through the engagement with a rough surface over which it moves, is eliminated.

The tool embodies a cylindrical spindle having a drive and a working end, the latter of which is formed into a truncated conical head, the taper of which enlarges toward the end. A tubular element is provided over the spindle having a cage at the working end containing slots in which truncated conical rollers are carried in a manner to be moved outwardly and inwardly when the cage and head are relatively moved longitudinally of each other. Pressure applying means is provided between the spindle and the tube to produce the relative movement which expands and retracts the truncated conical rollers relative to the axis of the spindle. The pressure means may be a fluid actuated ram or a spring unit which produces a substantial outward controlled force on the rollers which are thereby capable of crushing the projections on the inner wall of the cylinder when the cylinder is relatively passed thereover. With this arrangement, it will be noted that the truncated conical rollers have the small end at the end of the cage which permits some shifting thereof when entering the workpiece and starting the crushing and burnishing operation. After the rollers are passed through the cylinder, the pressure is removed between the rollers and spindle head by the reverse movement therebetween which contracts the rollers and permit the workpiece to be removed therefrom. A slight angularly disposition of the rollers on the head, such as 3° or less, will cause the rollers to produce a feed to automatically advance the workpiece thereover during the burnishing operation.

BRIEF DESCRIPTION OF THE DRAWINGS

FIG. 1 is a view in elevation with parts in section showing a burnishing tool which embodies features of the present invention;

FIG. 2 is an enlarged, broken sectional view of the pressure applying portion of the tool illustrated in FIG. 1;

FIG. 3 is an enlarged sectional view of the structure illustrated in FIG. 1, taken on the line 3–3 thereof;

FIG. 4 is a view of structure, similar to that illustrated in FIG. 1, showing a different form of pressure applying device provided thereon, and FIG. 5 is an enlarged, broken sectional view of the structure illustrated in FIG. 4, showing the pressure applying portion thereof.

DESCRIPTION OF THE PREFERRED EMBODIMENTS

Referring to FIGS. 1 to 3, a burnishing tool is illustrated embodying the features of the present invention which includes a spindle 11 having a driving end 12 and a working end 13. The working end has a diverging truncated conical head 14 containing a threaded stud 15 which is screwed into a threaded aperture 16 on the end of the spindle 11. The driving end 12 has an enlarged body portion 17 containing an outwardly extending flange 18 for supporting a flanged collar 19 between a thrust bearing 21 and a washer 22 secured on the enlarged body portion 17 by split ring 23 disposed in a slot therein. A flange 24 on the collar 19 has a cylindrical element 25 secured thereto by a plurality of screws 26.

The cylindrical element 25 has an outer cylindrical wall 27 containing a thread 28. The wall has an aperture 29 therethrough containing a fitting 31 by which fluid under pressure is introduced into the inner area of the cylindrical element 25. An inner cylindrical element 32 is threaded into a threaded cylindrical aperture 33 of the cylindrical element 25 to provide an annular recess 34 for receiving a washer-like piston 35. The inner and outer walls of the piston are sealed to the inner and outer walls of the cylindrical elements 32 and 25 by O-rings 36 and 37, respectively. The washer-like piston 35 is retained within the annular recess 34 by a flanged nut 38 which is screwed upon the thread 28 on the wall 27 of the cylindrical element 25 and retained in position by a plurality of set screws 39. The bottom of the washer-like piston 35 has a plurality of apertures 41, six being employed in the piston herein illustrated, in which springs 42 are disposed. The springs urge the piston inwardly within the annular recess 34 for producing a retractive movement thereto.

A thread 43 is provided on the inner lower wall of the piston to which a washer-like plate 44 is secured by a threaded engagement therewith. An O-ring 45 seals the plate 44 to the body of the spindle 11. A cage supporting tube or sleeve 46 is secured to a washer-like plate 47 by a washer 48 and a locking split ring 49 at one end and by a flange 51 and a thrust roller bearing 52 at the other end. The plate 47 has an aperture 53 therethrough with its outer end enlarged and threaded to receive a fitting 54 through which a coolant is delivered to the aperture 53. The aperture is in communication with an annular slot 55 in the wall of the sleeve 46 communicating with a plurality of apertures 56 extending therethrough for delivering the lubricant and/or flushing fluid between the spindle 11 and the sleeve 46.

The end of the tube or sleeve 46 has a thread 57 on the outer surface to which a cage 58 is secured by a thread engagement therewith. The cage has a plurality of axially extending slots 59 which are narrower at the working end of the tool than at the end opposite thereto. Truncated conical rollers 61 are disposed within the slots having a taper which is one-half of the taper of the head 14 so as to have the outer edges 62 thereof disposed in parallel relation to each other and to the axis of the head and spindle. As illustrated in FIG. 3, the one side 63 of the slots is disposed at an angle to prevent the rollers 61 from passing completely through the slots while permitting them to extend a desired distance beyond the outer face of the cage.

The delivery of fluid through a tube 64 secured to the fitting 31 of the cylindrical element 25 introduces fluid under pressure in the inner end of the annular recess 34 to provide a pressure for moving the piston 35 to the right. This moves the sleeve or tube 46 to the right advancing the rollers 61 along the head 14 to produce an outward movement to the rollers and the application of a substantial force to the inner wall 65 of a cylindrical workpiece 66 regulated by the pressure of the fluid advancing the piston. The workpiece 66 is secured by a clamp 67 of any known type to a table 68 which is reciprocably mounted on a base 69 and advanced and retracted by a ram 71. One pass of the workpiece over the rollers 61 moves the projections on the inner surfaces thereof into the adjacent depressions to produce a very low microfinish reading on the surface which is hardened by the working process. It is to be understood that by mounting the roller 61 at a slight angle of not more than 3°, the rollers will cause the workpiece to automatically advance and feed thereover during the machining operation.

After the workpiece has passed over the rollers 61, the fluid delivered by the tube 64 is shut off by the operation of a valve (not shown) which directs the fluid remaining in the cylinder to a tank by the expansion of the springs 42 and retraction of the piston 35. The retraction of the piston 35 moves the sleeve or tube 46 to the left to retract the rollers 61 along the head 14 and reduce the overall diameter of the rollers so that the workpiece may be removed therefrom. The diverging of the head 14 toward the outer end permits the smaller end of the rollers to be engaged by the inner surface of the workpiece which permits the shifting thereof at the beginning of the burnishing operation and the assumption of the proper relationship upon initiating the burnishing operation. This prevents the jamming of the rollers on the head as the workpiece advances thereover.

While the tool is herein illustrated as being mounted horizontally, it is to be understood that it may be attached to a vertically driven spindle to operate in a vertical direction. It is also to be understood that the same operation can be performed by the substitution of a spring device 72 for the piston device illustrated in FIGS. 1, 2 and 3. Such a spring device is illustrated in FIGS. 4 and 5 wherein a flanged plate 73 is carried on a tube or sleeve 74 by having a thicker portion 75 on the inner end provided with a flange 76. The plate 73 is secured against a thrust roller bearing 77 and the flange 76 by a washer 78 locked in position by a split spring ring 79 disposed in a slot in the portion 75. An arm 81 is secured to the plate 73 by a bolt 82 with its outer end disposed in abutted relation to a fixed member (not herein illustrated) for preventing the rotation of the plate 73.

The arm 81 has a piston rod 83 secured thereto which extends from a cylinder 84 for moving the plate 73 and sleeve or tube 74 to the left against a plurality of sets of Bellevue washerlike springs 85 for compressing the springs and retracting the rollers 61 for the purpose pointed out hereinabove. A spindle 86 extends through the spring units 45 and the sleeve or tube 74 for supporting the truncated conical head 14, the same as that described with regard to the structure of FIGS. 1 to 3. The spindle has an enlarged body portion 87 containing a thread 88 on which a flanged bushing 89 is screwed and locked in position by a nut 91. The bushing 89 abuts one end of the stacked pairs of springs while a flange 92 thereon engages a thrust roller bearing 94. A plate 93 is rotatably secured on the bushing 89 against the thrust roller bearing 94 by a split ring 95. An arm 96 extends outwardly to the plate 93 and prevents it from rotating.

A sealing element 97 is disposed between the lefthand end of the enlarged portion 75 of the sleeve or tube 86 for preventing the coolant passing through aperture 56 from passing outwardly from the lefthand end of the space between the spindle 86 and the sleeve or tube 74. The piston rod 83 retracts the sleeve or tube 74, moving it to the left against the pressure of the spring units 85 for retracting the rollers 61 and permitting the workpiece to be removed therefrom. As the pressure is reduced on the piston rod 83, the spring units 85 exert a pressure on the sleeve or tube 74 to cause it to move to the right relative to the spindle 85 and head 14 to expand the roller 61 and to provide a substantial outward pressure thereto controlled by the pressure of the fluid within the cylinder 84. The operation of the device is the same as that of the device described in detail relative to FIGS. 1 to 3, the only difference being the modification of structure to substitute the spring units 85 for the piston 35 employed in the first three figures.

The working force provided for the device of FIGS. 1 to 3 being the pressure of the fluid on the annular piston 35 and the retractive force on the rollers is that produced by the expansion of the springs 41 when the fluid pressure is removed. In the device of FIGS. 4 and 5, the springs 85 are adjusted to produce a desired working pressure and the retraction of the rollers is produced by the ram when compressing the springs 85 and which can also be used to control the amount of working pressure delivered by the springs.

The tool of the present invention produces the same burnishing operation on the wall of the aperture in like workpieces although the diameters thereof may vary over a substantial range. The tool, therefore, is self-adjusting when performing like burnishing operations irrespective of the variation in the diameters of the apertures being burnished.

What I claim is:

1. In a burnishing tool for producing a fine finish on the inner wall of a cylinder, a spindle having a truncated conical head, a sleeve on said spindle having a cage containing truncated conical rollers disposed in engagement with conical surfaces of said head, means for relatively moving the sleeve and spindle in one direction when the spindle is stationary or being driven in rotation for producing the expansion of the rollers and the application of substantial outward force thereto, and means for relatively moving said relatively movable means in the other direction when the spindle is stationary or when being driven in rotation for permitting the contraction of said rollers and the removal of pressure therefrom, said relatively movable means being relatively moved in one direction by a fluid and in the other direction by spring means.

2. A burnishing tool as recited in claim 1, wherein said fluid actuates nonrotatable ram which applies relative movement between the sleeve and spindle when stationary or when rotating for producing substantial outward pressure on the rollers controlled by the pressure of the fluid delivered to the ram.

3. A burnishing tool as recited in claim 2, wherein said spring means moves the spindle and sleeve when stationary or when rotating to produce the relative movement between the spindle and the cage and the contraction of the rollers when retracting said ram.

4. A burnishing tool are recited in claim 1, wherein said spring means applies relative movement between the spindle and sleeve when stationary or when rotating for producing substantial outward pressure on the rollers controlled by the degree of expansion of said spring means.

5. A burnishing tool as recited in claim 4, wherein said fluid means moves the spindle and sleeve when stationary or when rotating to produce the relative movement in retraction between the spindle and the cage and the contraction of the rollers when compressing said spring means 6. A burnishing tool as recited in claim 3, wherein a support is provided for the workpiece, and means for advancing and retracting said support and workpiece relative to said rollers.

7. In a burnishing tool for producing a fine finish on the inner wall of a cylinder, a spindle having a truncated conical head, a sleeve on said spindle having a cage containing truncated conical rollers disposed in engagement with conical surfaces of said head, means for relatively moving the sleeve and spindle in one direction when the spindle is stationary or when driven in rotation for producing the expansion of the rollers and the application of substantial outward force thereto, means for relatively moving said piston and sleeve in the other direction when the spindle is stationary or when driven in rotation for permitting the contraction of said rollers and the removal of pressure therefrom, an annular cylinder rotatably mounted on said spindle, and a washerlike piston in said cylinder for moving said cage to advance the retract said rollers.

8. A burnishing tool as recited in claim 7, wherein fluid pressure advances said piston, and spring means for retracting said piston when the fluid pressure is removed therefrom.

* * * * *